US008682265B2

(12) United States Patent
Tsujimoto et al.

(10) Patent No.: US 8,682,265 B2
(45) Date of Patent: Mar. 25, 2014

(54) RADIO COMMUNICATION APPARATUS, RADIO NETWORK SYSTEM, AND DATA LINK CONSTRUCTION METHOD USED FOR THE SAME

(75) Inventors: Ichiro Tsujimoto, Tokyo (JP); Takashi Hirano, Tokyo (JP); Yoshihiro Sera, Tokyo (JP); Shingo Nishikata, Tokyo (JP)

(73) Assignees: NEC Corporation, Tokyo (JP); Mitsubishi Heavy Industries, Ltd., Tokyo (JP)

( * ) Notice: Subject to any disclaimer, the term of this patent is extended or adjusted under 35 U.S.C. 154(b) by 406 days.

(21) Appl. No.: 13/088,743

(22) Filed: Apr. 18, 2011

(65) Prior Publication Data

US 2011/0269410 A1    Nov. 3, 2011

(30) Foreign Application Priority Data

Apr. 28, 2010    (JP) .................................. 2010-102799

(51) Int. Cl.
*H04B 1/02*    (2006.01)

(52) U.S. Cl.
USPC .......................................... 455/101; 455/431

(58) Field of Classification Search
USPC ............................ 455/101, 575.9, 404.2, 63.1
See application file for complete search history.

(56) References Cited

U.S. PATENT DOCUMENTS 7,916,074 B2 *    3/2011    Mathews et al. .......... 342/357.48

FOREIGN PATENT DOCUMENTS

| JP | 05-292084 A | 11/1993 |
|----|----|----|
| JP | 10-150401 A | 6/1998 |
| JP | 2001-507917 A | 6/2001 |
| JP | 2001-257637 A | 9/2001 |
| JP | 2002-135268 A | 5/2002 |
| JP | 2002-164798 A | 6/2002 |
| JP | 2003-198441 A | 7/2003 |
| JP | 2004-297664 A | 10/2004 |
| JP | 2006-148928 A | 6/2006 |
| JP | 2006-217228 A | 8/2006 |
| JP | 3841526 A | 11/2006 |
| JP | 2007-074561 A | 3/2007 |
| JP | 2007519314 A | 7/2007 |
| JP | 2009-055607 A | 3/2009 |

OTHER PUBLICATIONS

Communication dated Dec. 11, 2012 from the Japanese Patent Office in counterpart Japanese application No. 2010-102799.
Antenna engineering handbook, Ohm Corporation, Oct. 30, 1980, pp. 295, 305, 309 to 311, 319 to 323, 571 to 575, 589, and 592 to 601.

* cited by examiner

*Primary Examiner* — Tu X Nguyen
(74) *Attorney, Agent, or Firm* — Sughrue Mion, PLLC

(57) ABSTRACT

The present invention provides a radio communication apparatus that does not need installation of multiple radio devices in a communication node and requires only a single radio device to construct a data link of any of line-of-sight communication, over-the-horizon communication and aerial-vehicle communication. A radio communication apparatus includes a line-of-sight communication processing part that controls a beam from a phased array antenna to establish a line-of-sight communication, which is used when there is no obstacle in a radio transmission channel, an over-the-horizon communication processing part that controls the beam from the phased array antenna to establish an over-the-horizon communication, which is used when there is an obstacle in the radio transmission channel, and an aerial-vehicle communication processing part that controls the beam from the phased array antenna to establish an aerial-vehicle communication, which is used for communication with a communication node on a flying object, and the phased array antenna switches among the line-of-sight communication, the over-the-horizon communication and the aerial-vehicle communication.

17 Claims, 14 Drawing Sheets

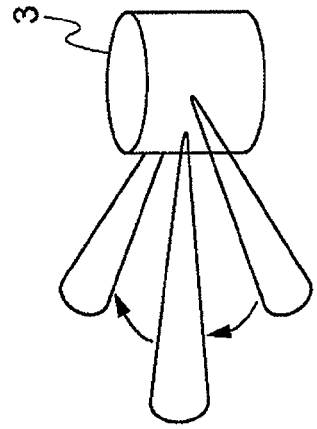

FIG. 2A  OH COMMUNICATION: A PLURALITY OF MULTIPLE BEAMS ARE EMITTED TO TROPOSPHERE TO ACHIEVE SPATIAL DIVERSITY COMMUNICATION

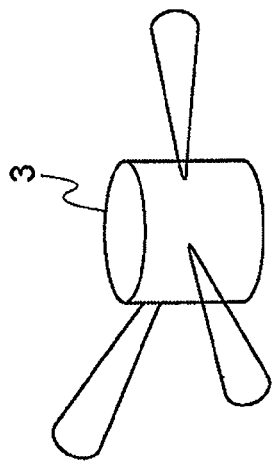

FIG. 2B  LOS COMMUNICATION: MULTIPLE BEAMS ARE FORMED IN DIFFERENT DIRECTIONS TO ACHIEVE MULTI-DIMENSIONAL COMMUNICATION

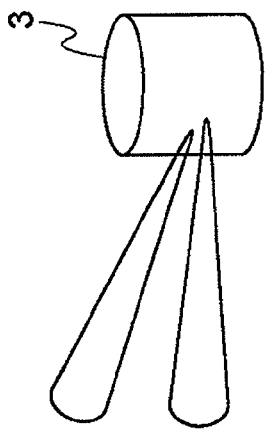

FIG. 2C  AV COMMUNICATION: BEAM IS STEERED TO OBJECT MOVING IN SKY TO ENABLE TRACKING OF OBJECT EVEN WHEN ANTENNA HAS NO MECHANICAL DRIVER

FIG. 12

NODE THAT WANTS TO START COMMUNICATION TRANSMITS COMMUNICATION REQUEST TO EXTERNAL CONTROL DEVICE

[COMMUNICATION REQUEST PARAMETER]
- A SOURCE NODE / DESTINATION NODE : NODE IDS OF SOURCE NODE AND DESTINATION NODE (SUCH AS IP ADDRESS),
- COMMUNICATION METHOD : ONLY SYNCHRONOUS COMMUNICATION IS PERMITTED, ONLY ASYNCHRONOUS COMMUNICATION IS PERMITTED, BOTH COMMUNICATIONS ARE PERMITTED AND SO ON
- REQUIRED TRANSMISSION CAPACITY : FIXED CAPACITY, VARIABLE CAPACITY (INCLUDING MAXIMUM CAPACITY, MINIMUM CAPACITY AND AVERAGE CAPACITY)
- MAXIMUM DELAY TIME : ALLOWABLE VALUE OF TOTAL DELAY TIME BETWEEN SOURCE AND DESTINATION
- COMMUNICATION PRIORITY : QoS VALUE OR THE LIKE
- RELIABILITY : BER, ANTI-INTERCEPTION PERFORMANCE AND ANTI-INTERFERENCE PERFORMANCE OF ENTIRE RADIO SECTION

EXTERNAL CONTROL DEVICE CALCULATES NEW ROUTE FROM INFORMATION ABOUT EXISTING COMMUNICATION AND DESIGNS COMMUNICATION LINE

[ELEMENTS OF ROUTE CALCULATION]
- DETERMINE COMMUNICATION METHOD FOR EACH PAIR OF NODES FROM POSITIONAL INFORMATION ABOUT NODES, TOPOLOGY INFORMATION AND FREQUENCY UTILIZATION OF RELEVANT AREA
- DETERMINE ROUTE THAT OPTIMIZES DELAY TIME
- SELECT ROUTE THAT PROVIDES REQUIRED TRANSMISSION CAPACITY, ROUTE FOR LOAD SHARING AND BYPASS ROUTE IN CASE OF FAILURE
- OPTIMIZE ROUTE SO AS TO ELIMINATE A COMMUNICATION OF SIMILAR CONTROL PRIORITY
- SELECT ROUTE OR PROPAGATION PATH THAT CAN MINIMIZE (SAVE) TRANSMISSION POWER
- CALCULATE BER BASED ON DESIGNED COMMUNICATION LINE
- EVALUATE ANTI-INTERCEPTION PERFORMANCE AND ANTI-INTERFERENCE PERFORMANCE FROM COMMUNICATION METHOD, FREQUENCY AND TRANSMISSION PATH
- PERFORM HANDOVER OF ANY NODE THAT IS MOVING OBJECT AT DESTINATION OF MOVEMENT

TRANSMIT ROUTE INFORMATION TO RADIO COMMUNICATION APPARATUS AND ROUTER PART

RADIO COMMUNICATION APPARATUS, RADIO NETWORK SYSTEM, AND DATA LINK CONSTRUCTION METHOD USED FOR THE SAME

INCORPORATION BY REFERENCE

This application is based upon and claims the benefit of priority from Japanese patent application No. 2010-102799, filed on Apr. 28, 2010, the disclosure of which is incorporated herein its entirety by reference.

BACKGROUND OF THE INVENTION

1. Field of the Invention

The present invention relates to a radio communication apparatus, a radio network system, and a data link construction method used for the same. In particular, it relates to a method of constructing a data link in a three-dimensional mesh network that interconnects communication nodes widely distributed and communication nodes on flying objects without using satellite communication, which involves a significant transmission delay time.

2. Description of the Related Art

In the mesh network described above, communication nodes are interconnected by radio line-of-sight (LOS) communication if there is no obstacle in the radio transmission channel therebetween (see Japanese Patent Laid-Open Nos. 2001-257637 and 2002-135268, for example), and communication nodes are interconnected by radio over-the-horizon (OH) communication (which is a communication method relying on tropospheric scattering) if there is an obstacle in the radio transmission channel therebetween (see Japanese Patent Laid-Open Nos. 05-292084 and 2002-164798, for example).

The mesh network described above also uses aerial-vehicle (AV) communication for communication with communication nodes on flying objects (see Japanese Patent No. 3841526, for example).

In the LOS communication, an automatic equalization processing is performed to automatically correct propagation distortion to improve communication quality. In the OH communication, an automatic diversity equalization processing is performed to automatically correct phasing and propagation distortion to improve communication quality. In the AV communication, a moving-object-tracking communication processing is performed to track a moving flying object to maintain communication.

SUMMARY

For the three-dimensional mesh network described above relating to the present invention has a problem that, in which the LOS communication, the OH communication and the AV communication are used to establish radio communication among the communication nodes, each communication node needs to have all the radio devices for the LOS communication, the OH communication and the AV communication to construct a data link.

An object of the present invention is to provide a radio communication apparatus, a radio network system and a data link construction method used for the same that do not need installation of multiple radio devices in a communication node and require only a single radio device to construct a data link of any of the LOS communication, the OH communication and the AV communication.

A radio communication apparatus according to the present invention includes: a line-of-sight communication processing part that controls a beam from a phased array antenna to establish a line-of-sight communication, which is used when there is no obstacle in a radio transmission channel; an over-the-horizon communication processing part that controls the beam from the phased array antenna to establish an over-the-horizon communication, which is used when there is an obstacle in the radio transmission channel and an aerial-vehicle communication processing part that controls the beam from the phased array antenna to establish an aerial-vehicle communication, which is used for communication with a communication node on a flying object, and the phased array antenna switches among the line-of-sight communication, the over-the-horizon communication and the aerial-vehicle communication.

A radio network system according to the present invention includes the radio communication apparatus described above.

In a data link construction method according to the present invention, a radio communication apparatus is configured to be capable of performing a line-of-sight communication processing that controls a beam from a phased array antenna to establish a line-of-sight communication, which is used when there is no obstacle in a radio transmission channel; an over-the-horizon communication processing that controls the beam from the phased array antenna to establish an over-the-horizon communication, which is used when there is an obstacle in the radio transmission channel and an aerial-vehicle communication processing that controls the beam from the phased array antenna to establish an aerial-vehicle communication, which is used for communication with a communication node on a flying object, and the data link construction method includes a switch processing that switches among the line-of-sight communication, the over-the-horizon communication and the aerial-vehicle communication with the phased array antenna.

BRIEF DESCRIPTION OF THE DRAWINGS

FIG. 2A is a diagram for illustrating a communication method implemented by the radio communication apparatus according to a first exemplary embodiment of the present invention;

FIG. 2B is a diagram for illustrating a communication method implemented by the radio communication apparatus according to a first exemplary embodiment of the present invention;

FIG. 2C is a diagram for illustrating a communication method implemented by the radio communication apparatus according to a first exemplary embodiment of the present invention;

FIG. 12 is a diagram for illustrating a operation of the radio network system according to a third exemplary embodiment of the present invention;

EXEMPLARY EMBODIMENTS

In the following, exemplary embodiments of the present invention will be described below with reference to the drawings. First, a radio network system according to the present invention will be schematically described.

A radio network system according to the present invention does not require each communication node to have multiple radio devices but requires only a single radio device to construct a data link of any of line-of-sight (LOS) communication, over-the-horizon (OH) communication and aerial-vehicle (AV) communication, because the radio network system comprises a cylindrical phased array antenna and a radio device and can use multiple beams of the phased array antenna to establish any of the LOS communication on a radio transmission channel that includes no obstacle, the OH communication on a radio transmission channel that includes an obstacle, and the AV communication with a communication node on a flying object.

For the mesh network according to the related art described above, different frequency bands are used for the LOS communication, the OH communication and the AV communication, and therefore, the overall frequency band required to construct a data link is wide accordingly.

However, according to the present invention, mesh data links of all of the LOS communication, the OH communication and the AV communication can be constructed in the same frequency band with the aid of a multiple access, such as time division multiple access (TDMA), frequency division multiple access (FDMA), space division multiple access (SDMA) and code division multiple access (CDMA).

Figure 1:
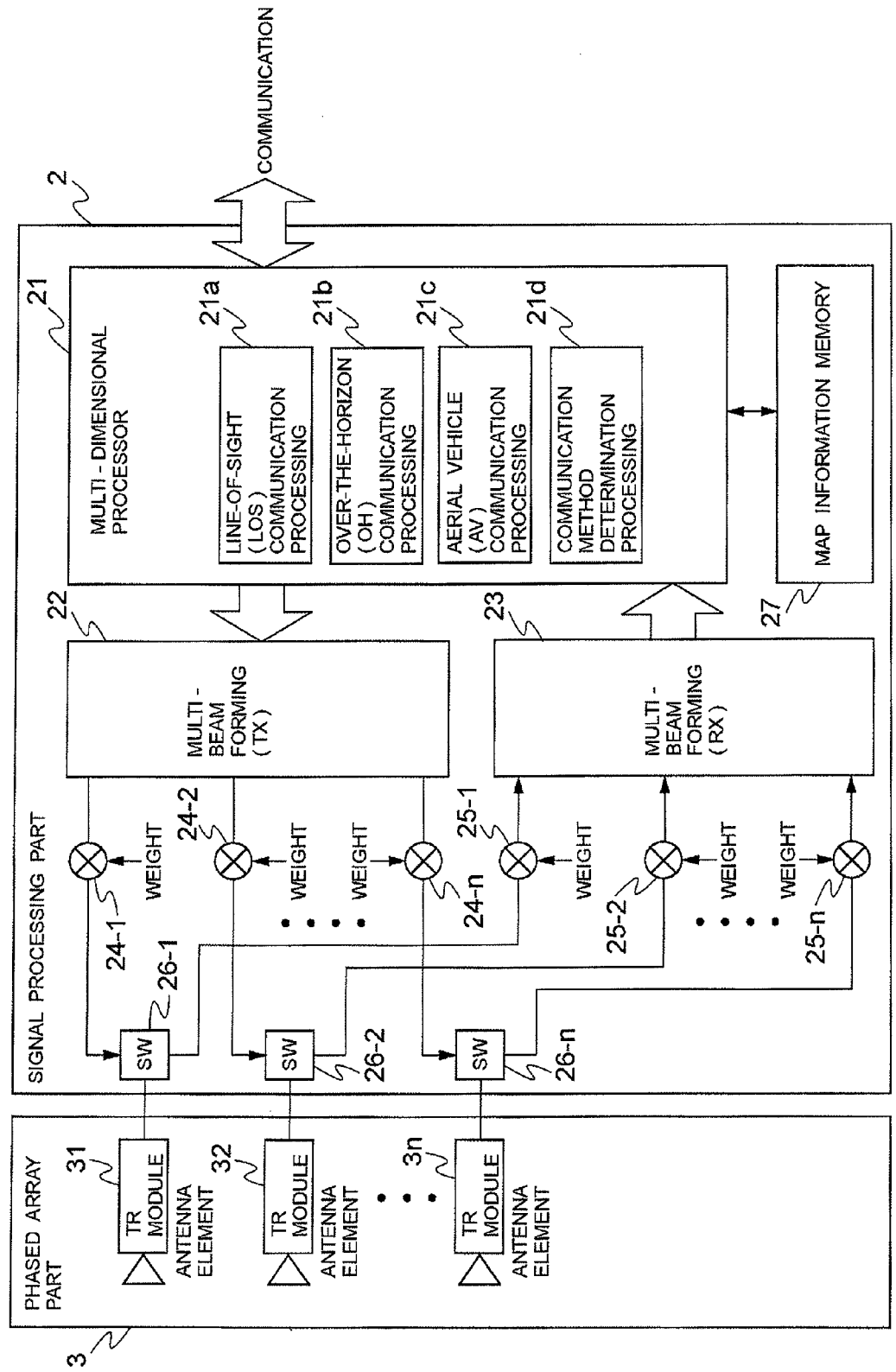
FIG. 1 is a block diagram showing an exemplary configuration of a radio communication apparatus according to a first exemplary embodiment of the present invention.

FIG. 1 is a block diagram showing a configuration of a radio communication apparatus according to a first exemplary embodiment of the present invention. A radio communication apparatus 1 includes a signal processing part 2 and a phased array part (a cylindrical phased array antenna, for example) 3.

The signal processing part 2 includes a multi-dimensional processor 21, a transmitting multi-beam forming part (TX) 22, a receiving multi-beam forming part (RX) 23, multipliers 24-1 to 24-$n$ and 25-1 to 25-$n$, switches (SW) 26-1 to 26-$n$, and a map information memory 27.

The multi-dimensional processor 21 performs a LOS communication processing 21$a$, an OH communication processing 21$b$, an AV communication processing 21$c$, and a communication method determination processing 21$d$.

The phased array part 3 includes transmit & receive (TR) modules 31 to 3$n$ each provided with an antenna element.

In the LOS communication processing 21$a$, an automatic equalization processing is performed to automatically correct propagation distortion to improve communication quality. In the OH communication processing 21$b$, an automatic diversity equalization processing is performed to automatically correct phasing and propagation distortion to improve communication quality. In the AV communication processing 21$c$, a moving-object-tracking communication processing is performed to track (pursue) a moving flying object to maintain communication.

The LOS communication processing 21$a$, the OH communication processing 21$b$ and the AV communication processing 21$c$ involve common processings: an antenna multi-beam processing to automatically scan a communication target and control the antenna gain and the transmission power in a way appropriate for the relevant communication method; a data link processing to share information among communication nodes in the mesh network; and a spatiotemporal signal processing, which is a combination of the SDMA relying on the multiple beams and the TDMA relying on the data link.

FIG. 2 are diagrams for illustrating communication methods implemented by the radio communication apparatus according to a first exemplary embodiment of the present invention. FIG. 2A illustrates a communication method based on the OH communication processing 21$b$, FIG. 2B illustrates a communication method based on the LOS communication processing 21$a$, and FIG. 2C illustrates a communication method based on the AV communication processing 21$c$.

In the case of the OH communication shown in FIG. 2A, the phased array part 3 emits a plurality of multiple beams to the troposphere to achieve spatial diversity communication.

In the case of the LOS communication shown in FIG. 2B, the phased array part 3 forms multiple beams in different directions to achieve multi-directional communication.

In the case of the AV communication shown in FIG. 2C, the phased array part 3 steers a beam to a flying object (aerial vehicle). Thus, the antenna does not have to have a mechanical driver to pursue (track) the flying object.

Figure 3:
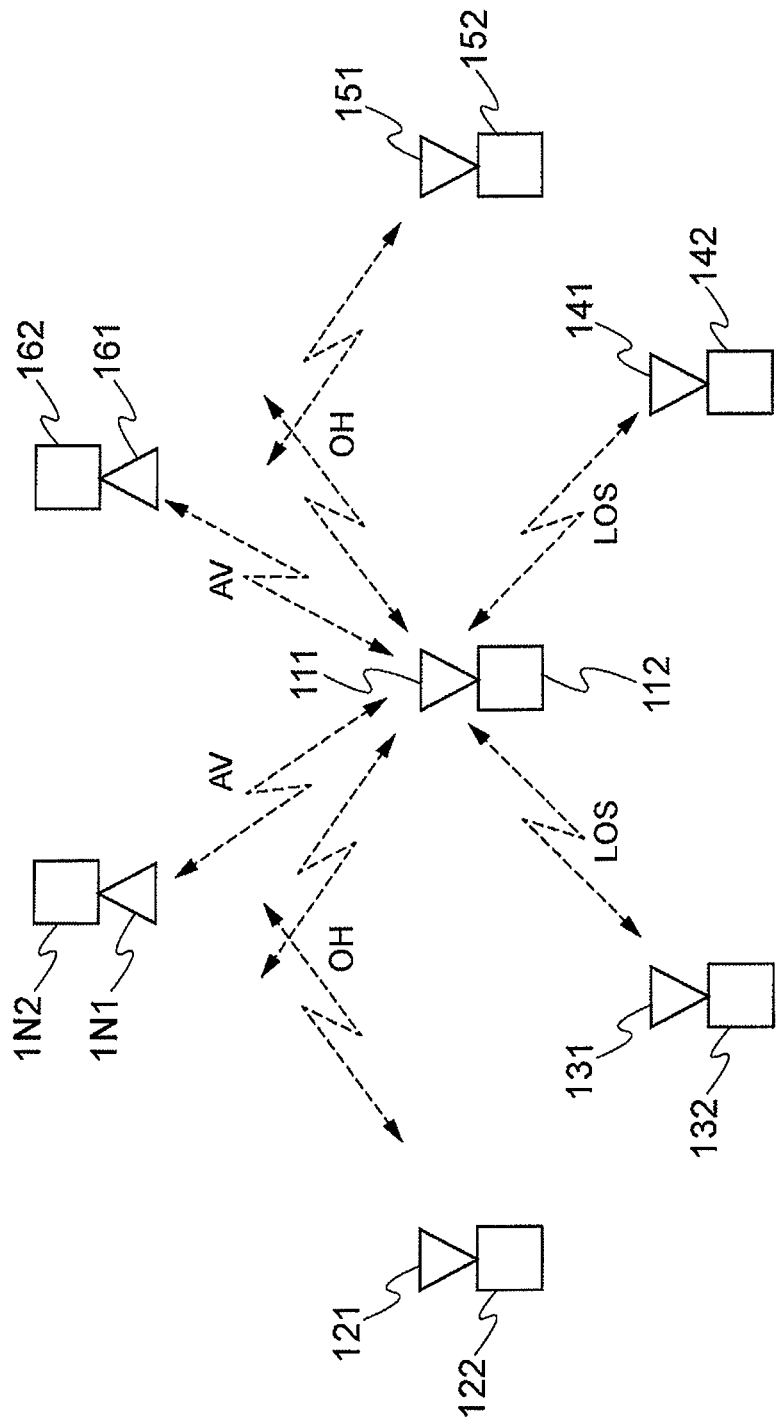
FIG. 3 is a block diagram illustrating a configuration of a radio network system according to a first exemplary embodiment of the present invention.

FIG. 3 is a block diagram illustrating a configuration of the radio network system according to a first exemplary embodiment of the present invention. As shown in FIG. 3, the radio network system according to a first exemplary embodiment of the present invention includes communication nodes 112, 122, 132, 142, 152, 162, ..., 1N2 provided with phased array antennas 111, 121, 131, 141, 151, 161, ..., 1N1, respectively (N denotes a natural number).

Each of the phased array antennas 111, 121, 131, 141, 151, 161, ..., 1N1 corresponds to the phased array part 3 in FIG. 1, and each of the communication nodes 112, 122, 132, 142, 152, 162, ..., 1N2 corresponds to the signal processing part 2 in FIG. 1.

In this case, the communication node 112 constructs a data link between the communication nodes 132 and 142 according to the LOS communication, a data link between the communication nodes 122 and 152 according to the OH communication, and a data link between the communication nodes 162 and 1N2 according to the AV communication.

Figure 4:
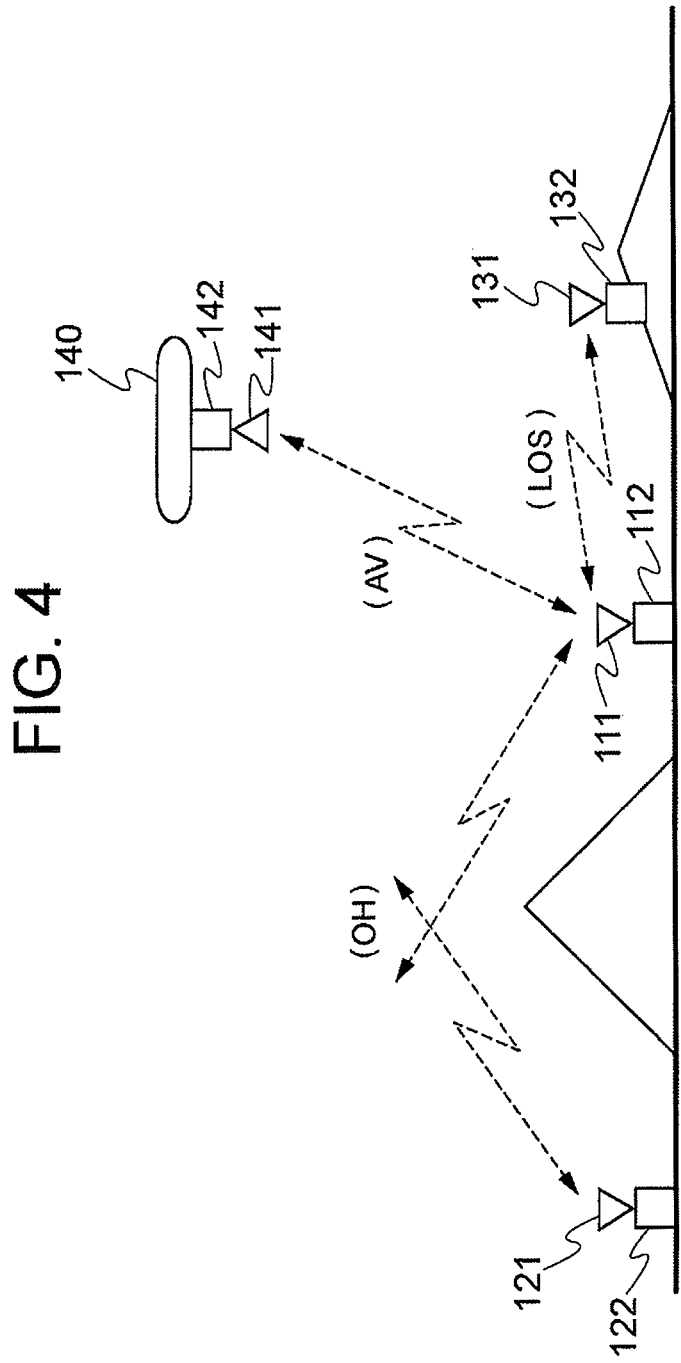
FIG. 4 is a diagram showing a communication method determination processing performed in the radio network system according to a first exemplary embodiment of the present invention.

FIG. 4 is a diagram showing a communication method determination processing performed in the radio network system according to a first exemplary embodiment of the present invention. In FIG. 4, in the communication method determination according to this embodiment, the multi-dimensional processor 21 in the signal processing part 2 of the communication node 112 performs the communication method determination processing 21*d* to determine which of the LOS communication processing 21*a*, the OH communication processing 21*b* and the AV communication processing 21*c* is to be performed.

If the communication node 112 constructs a data link to the communication node 132, the radio transmission channel to which includes no obstacle, the communication node 112 performs the communication method determination processing 21*d* in the following manner. That is, based on three-dimensional positional information about the communication node 132, the communication node 112 searches three-dimensional map information in the map information memory 27 to retrieve information about the topology from the three-dimensional position of the communication node 112 to the three-dimensional position of the communication node 132.

Then, the communication node 112 determines to use the LOS communication based on the presence or absence of an obstacle in the radio transmission channel to the link target (the communication node 132) or the presence or absence of movement of the link target (the communication node 132), for example, and invokes the LOS communication processing 21*a*.

Under the control of the invoked LOS communication processing 21*a*, the transmitting multi-beam forming part (TX) 22, the receiving multi-beam forming part (RX) 23, the multipliers 24-1 to 24-*n* and 25-1 to 25-*n* and the switches (SW) 26-1 to 26-*n* operate to construct a data link to the communication node 132 via the phased array parts 3 (the phased array antennas 111 and 131) according to the LOS communication.

If the communication node 112 constructs a data link to the communication node 122, the radio transmission channel to which includes an obstacle (a mountain in FIG. 4), the communication node 112 performs the communication method determination processing 21*d* in the following manner. That is, based on three-dimensional positional information about the communication node 122, the communication node 112 searches the three-dimensional map information in the map information memory 27 to retrieve information about the topology from the three-dimensional position of the communication node 112 to the three-dimensional position of the communication node 122.

Then, the communication node 112 determines to use the OH communication based on the presence or absence of an obstacle in the radio transmission channel to the link target (the communication node 122) or the presence or absence of movement of the link target (the communication node 122), for example, and invokes the OH communication processing 21*b*.

Under the control of the invoked OH communication processing 21*b*, the transmitting multi-beam forming part (TX) 22, the receiving multi-beam forming part (RX) 23, the multipliers 24-1 to 24-*n* and 25-1 to 25-*n* and the switches (SW) 26-1 to 26-*n* operate to construct a data link to the communication node 122 via the phased array parts 3 (the phased array antennas 111 and 121) according to the OH communication.

If the communication node 112 constructs a data link to the communication node 142 on a flying object 140 moving in the sky, the communication node 112 performs the communication method determination processing 21*d* in the following manner. That is, based on three-dimensional positional information about the communication node 142, the communication node 112 searches the three-dimensional map information in the map information memory 27 to retrieve the three-dimensional position of the communication node 142.

Then, the communication node 112 determines to use the AV communication based on the presence or absence of an obstacle in the radio transmission channel to the link target (the communication node 142) or the presence or absence of movement of the link target (the communication node 142), for example, and invokes the AV communication processing 21*c*.

Under the control of the invoked AV communication processing 21*c*, the transmitting multi-beam forming part (TX) 22, the receiving multi-beam forming part (RX) 23, the multipliers 24-1 to 24-*n* and 25-1 to 25-*n* and the switches (SW) 26-1 to 26-*n* operate to construct a data link to the communication node 142 via the phased array parts 3 (the phased array antennas 111 and 141) according to the AV communication.

Figure 5:
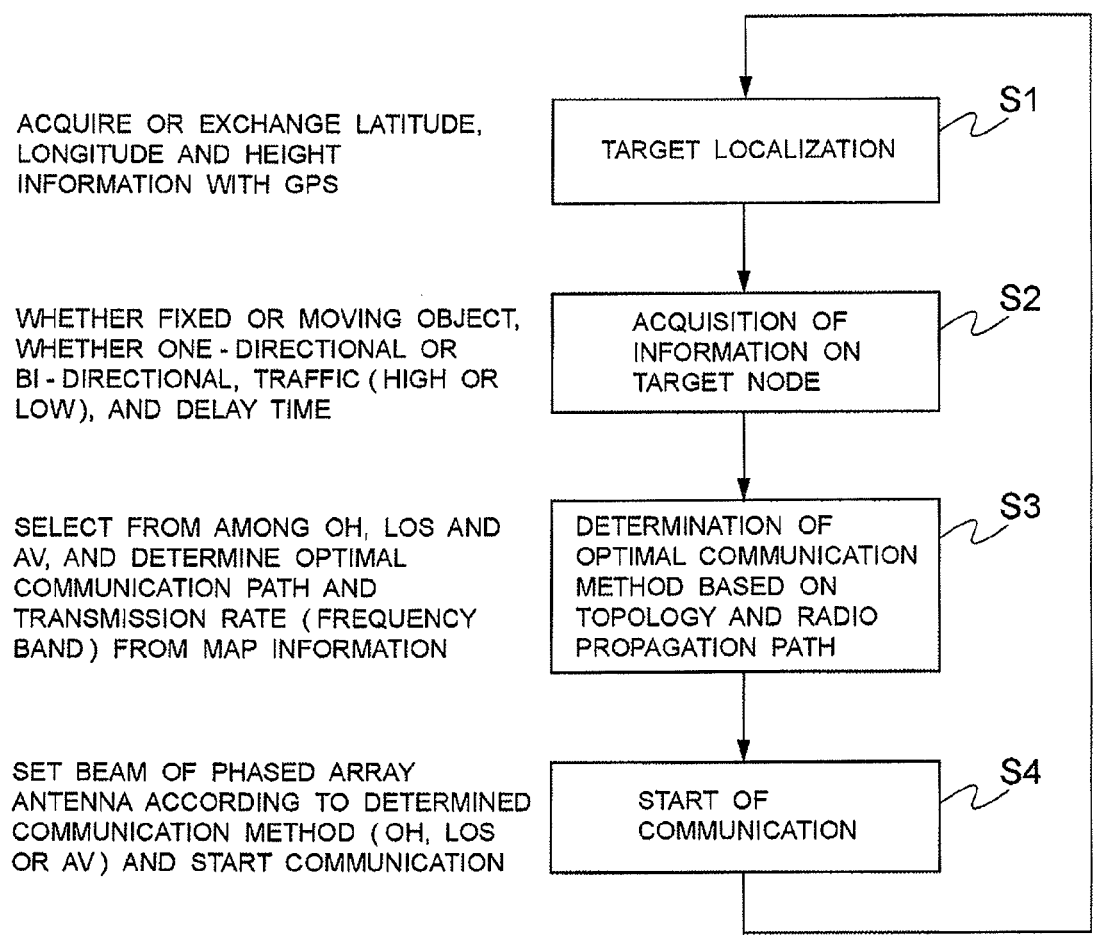
FIG. 5 is a diagram illustrating a flow of the communication method determination processing performed by the radio communication apparatus according to a first exemplary embodiment of the present invention.

FIG. 5 is a diagram illustrating a flow of the communication method determination processing performed by the radio communication apparatus according to a first exemplary embodiment of the present invention. With reference to FIGS. 1, 3 and 5, a flow of the communication method determination processing performed by the radio communication apparatus according to the first exemplary embodiment of the present invention will be described.

In this embodiment, each communication node 112, 122, 132, 142, 152, 162, . . . , 1N2 shown in FIG. 3 is provided with position detection means, such as the global positioning system (GPS), which obtains positional information (latitude, longitude and height information) about the communication node.

The multi-dimensional processor 21 in the signal processing part 2 of the radio communication apparatus 1 exchanges positional information with a target communication node via a bypass mute in the mesh network or using additional communication means to share their respective positional information (target localization) (step S1 in FIG. 5).

The multi-dimensional processor 21 in the signal processing part 2 of the radio communication apparatus 1 exchanges apparatus information (information on whether a stationary object or a moving object, whether one-way communication or bidirectional communication, the traffic (high or low), the transmission delay time or the like) with the target communication node to acquire the information about the target communication node (acquisition of the information about the target node) (step S2 in FIG. 5).

The multi-dimensional processor 21 in the signal processing part 2 of the radio communication apparatus 1 retrieves a radio propagation path from the topology map information on the communication section between the radio communication apparatus 1 and the target communication node stored in the map information memory 27, for example, and determines the optimal communication method to be applied (the LOS communication, the OH communication or the AV communication) and the transmission rate (frequency band) (determination of the optimal communication method based on the topology and the radio propagation path) (step S3 in FIG. 5).

Although the topology map information on the communication section between the radio communication apparatus 1 and the target communication node or the like is stored in the map information memory 27 in this embodiment, the topology map information or the like may be obtained from a server or the like via the mesh network each time the radio communication apparatus 1 makes the determination.

The multi-dimensional processor 21 in the signal processing part 2 of the radio communication apparatus 1 invokes the communication processing corresponding to the communication method determined (the LOS communication processing 21a, the OH communication processing 21b or the AV communication processing 21c), sets the beams of the phased array antenna according to the communication method determined, and then starts communication (start of communication) (step S4 in FIG. 5).

As can be seen from the above description, according to this embodiment, each communication node (radio communication apparatus) can switch among the LOS communication, the OH communication and the AV communication by using the phased array antenna.

In short, according to this embodiment, the communication node (radio communication apparatus) 112 constructs a one-to-N radio link (N represents an integer equal to or greater than 2) by means of: multi-beam forming means (the TR modules 31 to 3n and their respective antenna elements) in the phased array antenna that forms links in multiple directions; the means (implemented by the communication method determination processing 21d) of obtaining the three-dimensional positional information on the other communication nodes (radio communication apparatuses) 122, 132, 142, 152, 162, . . . , 1N2 (and determining the presence or absence of an obstacle in the radio transmission channel to a relevant link target and the presence or absence of movement of the link target) by means of the position detection means and determining the optimal propagation method for the link target; and the means (implemented in the multi-dimensional processor 21) of switching among the LOS communication, the OH communication and the AV communication according to the result of the determination by the above-described means.

In this embodiment, each communication node 112, 122, 132, 142, 152, 162, . . . , 1N2 automatically constructs a radio link by obtaining the three-dimensional positional information from the GPS or the like, determining which of the LOS communication, the OH communication and the AV communication is to be used for the point-to-point communication with the link target and controlling steering of the beams emitted from the phased array antenna.

Thus, according to this embodiment, the communication node does not require the separate radio devices for the LOS communication, the OH communication and the AV communication but requires only a single radio device to construct data links of all of these communication methods.

The flying object 140 cannot always be provided with the phased array antenna 141, so that the radio communication apparatus (the communication node 112) on the ground steers a beam to the flying object 140 to track (pursue) the flying object 140.

Figure 6:
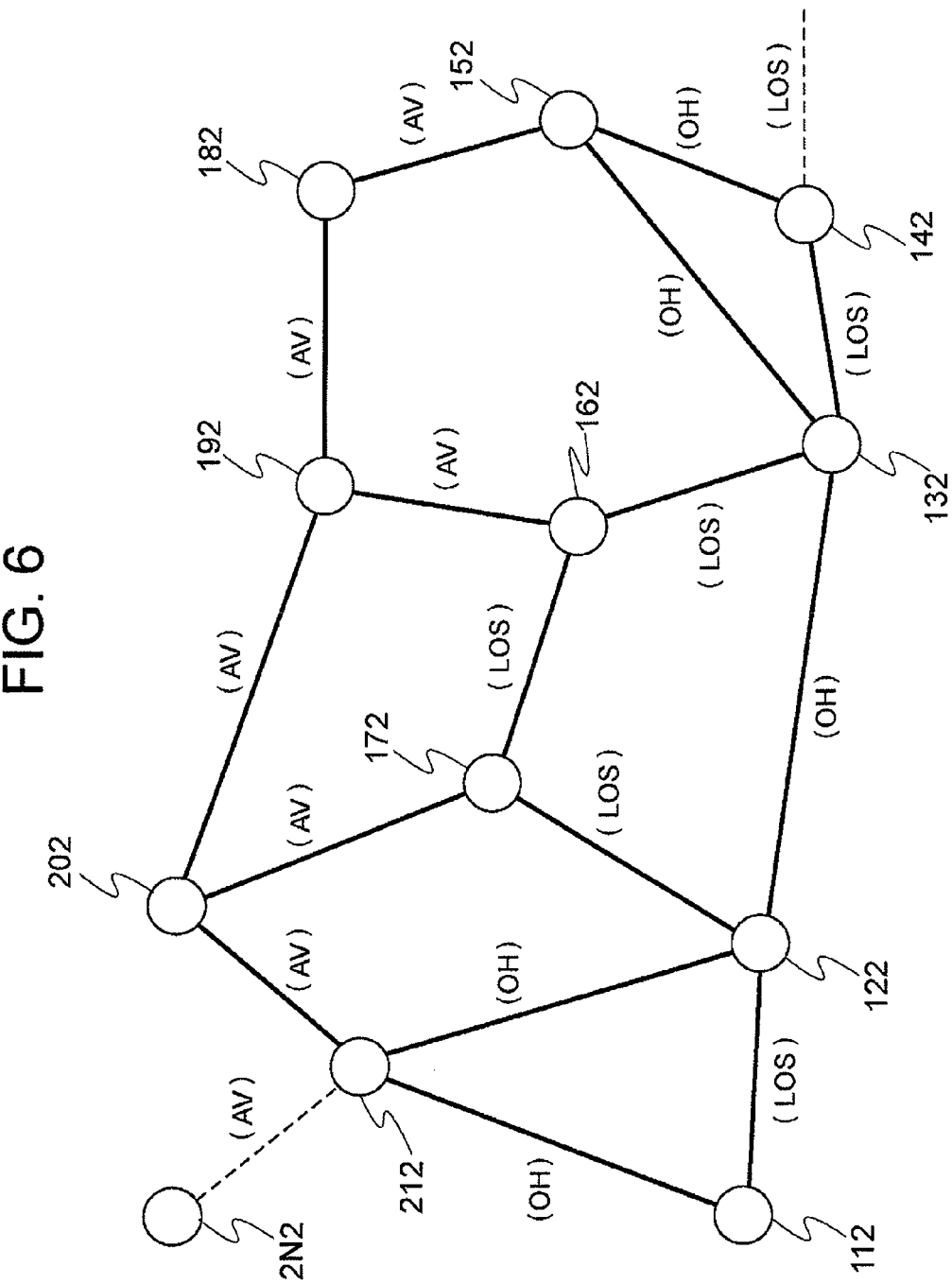
FIG. 6 is a block diagram showing a configuration of a radio network system according to a second exemplary embodiment of the present invention.

FIG. 6 is a block diagram showing a configuration of a radio network system according to a second exemplary embodiment of the present invention. In the radio network system according to the second exemplary embodiment of the present invention shown in FIG. 6, each communication node 112, 122, 132, 142, 152, 162, 172, 182, 192, 202, 212, . . . , 2N2 forms a one-to-N or N-to-N radio link network by using the multiple beams emitted from the phased array antenna and various multiple access techniques (such as TDMA, FDMA, SDMA and CDMA) in combination.

In this embodiment, assignment of the type of the multi-directional communication and the type of the multiple access technique is performed by assignment determination means used in combination with the antenna pattern null control means of preventing interference between communications in multiple directions (the method disclosed in Japanese Patent No. 2765377 described above, for example).

The communication node 112 constructs a radio link to the communication node 122 according to the LOS communication and constructs a radio link to the communication node 212 according to the OH communication.

The communication node 122 constructs radio clinks to the communication nodes 112 and 172 according to the LOS communication and constructs a radio link to the communication node 132 according to the OH communication.

The communication node 132 constructs radio links to the communication nodes 122 and 152 according to the OH communication and constructs radio links to the communication nodes 142 and 162 according to the LOS communication.

The communication node 142 constructs a radio link to the communication node 132 according to the LOS communication and constructs a radio link to the communication node 152 according to the OH communication.

The communication node 152 constructs radio links to the communication nodes 132 and 142 according to the OH communication and constructs a radio link to the communication node 182 according to the AV communication.

The communication node 162 constructs radio links to the communication nodes 132 and 172 according to the LOS communication and constructs a radio link to the communication node 192 according to the AV communication.

The communication node 172 constructs radio links to the communication nodes 122 and 162 according to the LOS communication and constructs a radio link to the communication node 202 according to the AV communication.

The communication node 182 constructs radio links to the communication nodes 152 and 192 according to the AV communication. The communication node 192 constructs radio links to the communication nodes 162 and 202 according to the AV communication. The communication node 202 constructs radio links to the communication nodes 172, 192 and 212 according to the AV communication.

The communication node 212 constructs radio links to the communication nodes 112 and 122 according to the OH communication and constructs a radio link to the communication node 2N2 according to the AV communication.

Figure 7:
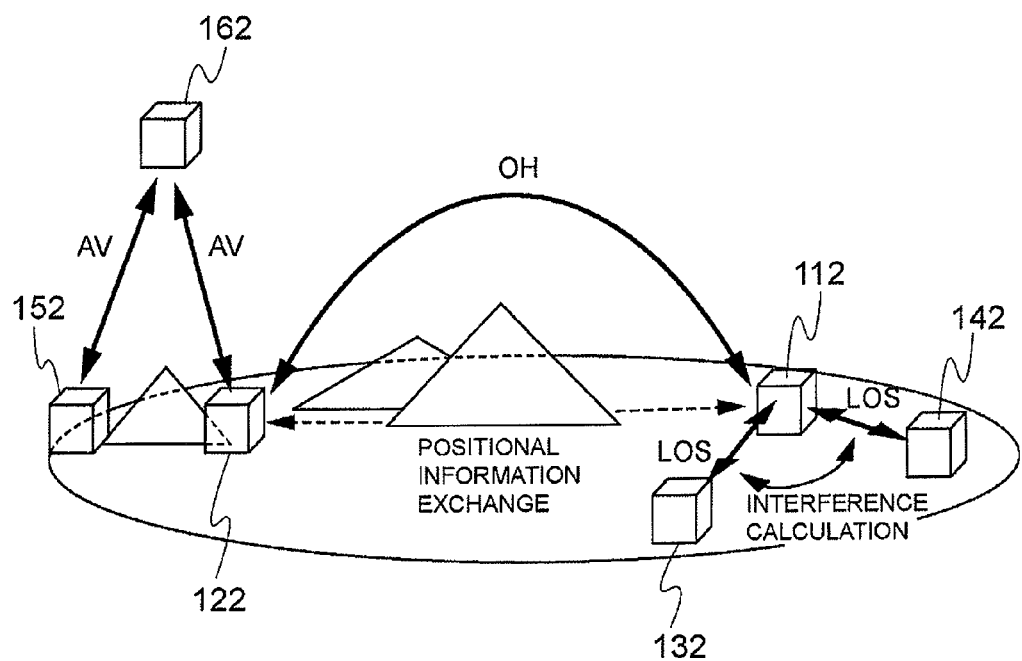
FIG. 7 is a diagram for illustrating an operation of the radio network system according to a second exemplary embodiment of the present invention.
Figure 8:
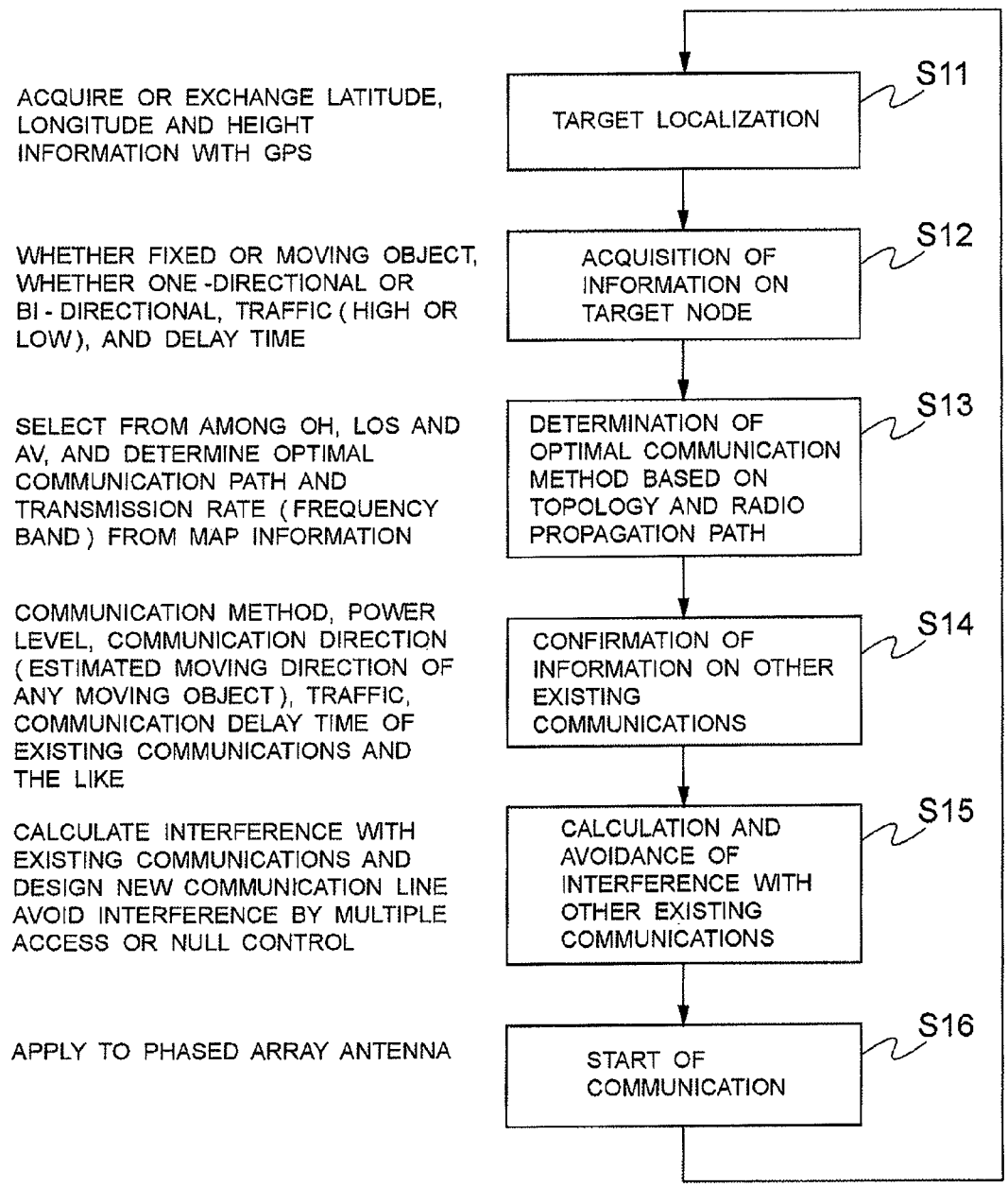
FIG. 8 is a diagram illustrating a flow of a communication method determination processing performed by a radio communication apparatus according to a second exemplary embodiment of the present invention.
Figure 9:
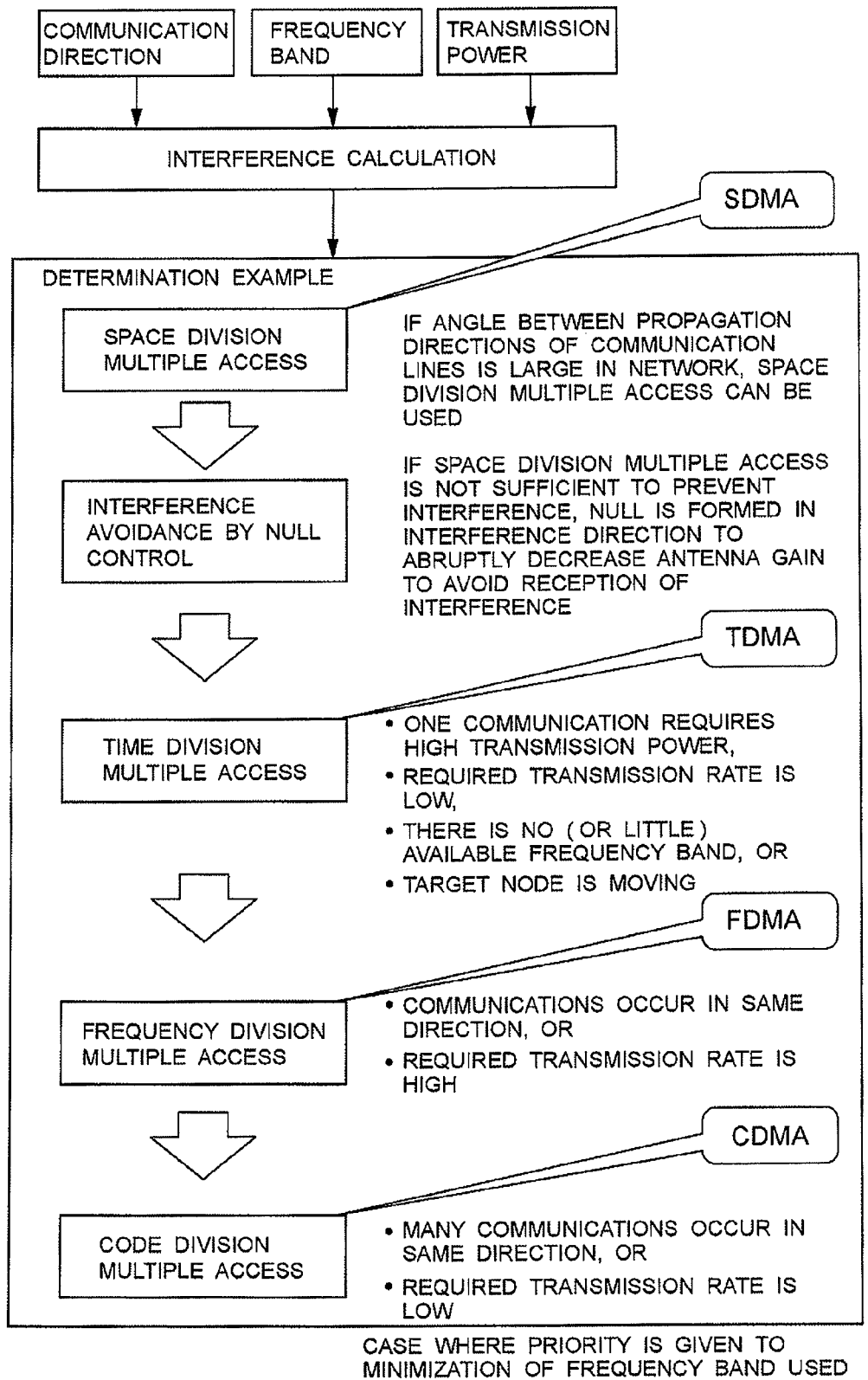
FIG. 9 is a diagram for illustrating a communication method determination by the radio communication apparatus according to a second exemplary embodiment of the present invention.
Figure 10:
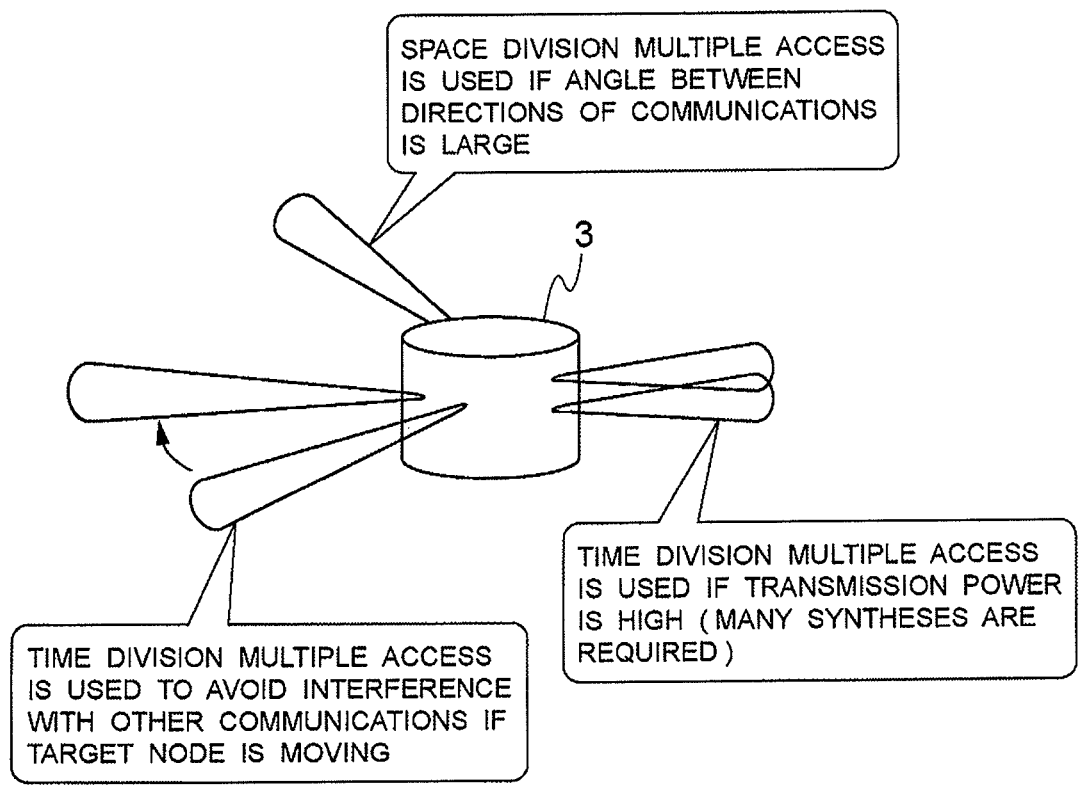
FIG. 10 is a diagram for illustrating a communication method determination by the radio communication apparatus according to a second exemplary embodiment of the present invention.

FIG. 7 is a diagram for illustrating an operation of the radio network system according to a second exemplary embodiment of the present invention. FIG. 8 is a diagram illustrating a flow of a communication method determination processing performed by a radio communication apparatus according to a second exemplary embodiment of the present invention. FIGS. 9 and 10 are diagrams for illustrating a communication method determination by the radio communication apparatus according to a second exemplary embodiment of the present invention. With reference to FIGS. 7 to 10, a flow of the communication method determination processing performed by the radio communication apparatus according to the second exemplary embodiment of the present invention will be described.

In this embodiment shown in FIG. 7, each communication node 112 to 162 is provided with position detection means, such as GPS, which obtains positional information (latitude, longitude and height information) about the communication node.

The multi-dimensional processor 21 in the signal processing part 2 of the radio communication apparatus 1 exchanges positional information with a target communication node via a bypass mute in the mesh network or using additional communication means to share their respective positional information (target localization) (step S11 in FIG. 8).

The multi-dimensional processor 21 in the signal processing part 2 of the radio communication apparatus 1 exchanges apparatus information (information on whether a stationary object or a moving object, whether one-way communication or bidirectional communication, the traffic (high or low), the transmission delay time or the like) with the target communication node to acquire the information about the target communication node (acquisition of the information about the target node) (step S12 in FIG. 8).

The multi-dimensional processor 21 in the signal processing part 2 of the radio communication apparatus 1 retrieves a radio propagation path from the topology map information on the communication section between the radio communication apparatus 1 and the target communication node stored in the map information memory 27, for example, and determines the optimal communication method to be applied (the LOS communication, the OH communication or the AV communication) and the transmission rate (frequency band) (determination of the optimal communication method based on the topology and the radio propagation path) (step S13 in FIG. 8).

Although the topology map information on the communication section between the radio communication apparatus 1 and the target communication node or the like is stored in the map information memory 27 in this embodiment, the topology map information or the like may be obtained from a server or the like each time the radio communication apparatus 1 makes the determination.

In forming a network of a plurality of radio links, the multi-dimensional processor 21 in the signal processing part 2 of the radio communication apparatus 1 confirms information about the other existing communication links (the communication method, the power level, the communication direction (the estimated movement direction in the case of a moving object) of the existing communications, the traffic, the transmission delay time or the like) in order to prevent electromagnetic interference among the target communication nodes (confirmation of information about other existing communications) (step S14 in FIG. 8).

Based on the result of the confirmation described above, the multi-dimensional processor 21 in the signal processing part 2 of the radio communication apparatus 1 calculates interference with the existing communications and designs the new communication line to establish communication by selectively using multiple access means (TDMA, FDMA, CDMA, SDMA or the like) or to establish communication while avoiding interference by forming a null in beam forming in order to avoid interference with the other, existing communications (calculation and avoidance of interference with the other, existing communications) (step S15 in FIG. 8).

Next, selection of the multiple access means will be described with reference to FIGS. 9 and 10. The radio communication apparatus 1 calculates interference from the communication direction, the frequency band and the transmission power and selects from among the multiple access means in the following manner if priority is given to minimization of the frequency band used.

If the angle between the propagation directions of the communication lines in the network is large, the SDMA can be used. If the SDMA is not sufficient to prevent interference, a null is formed in the interference direction to abruptly decrease the antenna gain, thereby avoiding reception of the interference (avoidance of interference by null control).

If one of the communications requires high transmission power, the required transmission rate is low, there is no (or little) available frequency band, or the target communication node is moving, the TDMA is used to avoid interference with the other communications.

If there are communications occurring in the same direction, or the required transmission rate is high, the FDMA is used.

If there are many communications occurring in the same direction or the required transmission rate is low, the CDMA is used.

The multi-dimensional processor 21 in the signal processing part 2 of the radio communication apparatus 1 invokes the communication processing corresponding to the communication method determined (the LOS communication processing 21a, the OH communication processing 21b or the AV communication processing 21c), sets the beams to be emitted from the phased array antenna according to the communication method determined, applies the above-described interference-avoiding measure to the phased array antenna and starts communication (start of communication) (step S16 in FIG. 8).

As can be seen from the above description, according to this embodiment, in forming a three-dimensional mesh network, different multiple access controls are combined to increase the frequency reuse efficiency in the limited frequency band to achieve seamless linkage in the mesh network.

Figure 11:
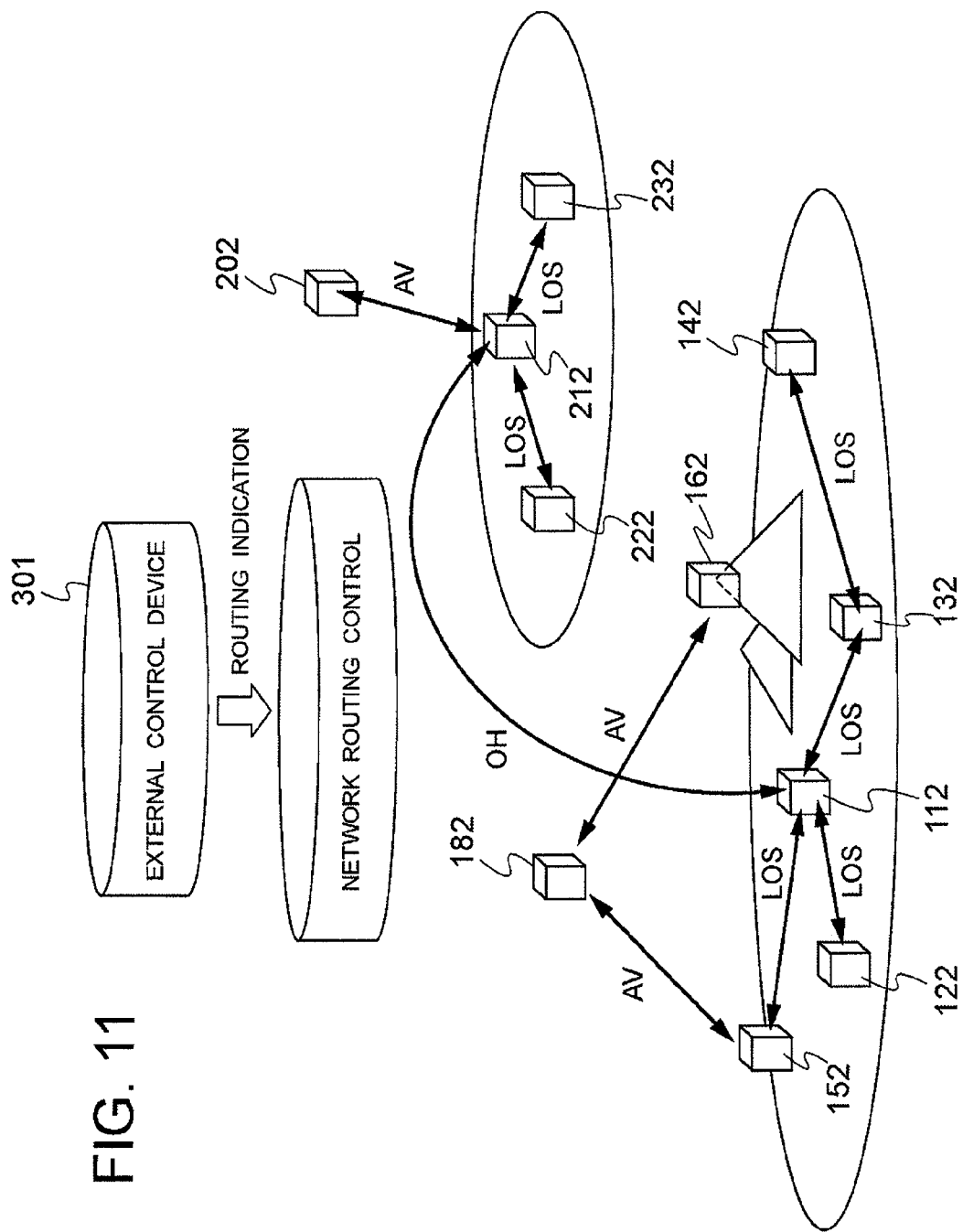
FIG. 11 is a block diagram showing a configuration of a radio network system according to a third exemplary embodiment of the present invention.

FIG. 11 is a block diagram showing a configuration of a radio network system according to a third exemplary embodiment of the present invention. The radio network system according to the third exemplary embodiment of the present invention shown in FIG. 11 has the same configuration and operates in the same way as those according to the first and second exemplary embodiments of the present invention described above, except that an external control device 301 for network routing control is provided. The external control device 301 is connected to any of the communication nodes in the radio network system shown in FIG. 11 and transmits a routing indication signal to each communication node involved in the routing via the network.

In this embodiment, according to the network routing indication from the external control device 301, the propagation method (the LOS communication, the OH communication or the AV communication) in the network is determined, a multiple access parameter is determined, and null control of the antenna pattern is performed, thereby providing a network that avoids interference between the communications in the multiple directions.

FIG. 12 is a diagram for illustrating an operation of the radio network system according to a third exemplary embodiment of the present invention. An operation of the radio network system according to the third exemplary embodiment of the present invention will be described with reference to FIG. 12.

First, a communication node that wants to start communication transmits a communication request to the external control device 301. In this case, communication request parameters include a source node/destination node (the node IDs of the source node and the destination node, such as the Internet Protocol (IP) addresses thereof), a communication method (only the synchronous communication is permitted, only the asynchronous communication is permitted, or both the communications are permitted), a required transmission capacity (a fixed capacity or a variable capacity (including the maximum capacity, the minimum capacity and the average capacity)), a maximum delay time (an allowable value of the total delay time between the source and the destination), a communication priority (the quality of service (QoS) value or the like), and a reliability (the bit error rate (BER), the anti-interception performance and the anti-interference performance of the entire radio section).

Then, the external control device 301 calculates a new route from information about the existing communication and designs a communication line. In this case, the mute calculation is performed by determining the communication method for each pair of nodes from the positional information about the nodes, the topology information and the frequency utilization of the relevant area, determining a route that optimizes the delay time, selecting a route that provides the required transmission capacity, a route for load sharing and a bypass route in case of a failure, optimizing the route so as to eliminate a communication of similar control priority, selecting a route or propagation path that can minimize (save) the transmission power, calculating the BER based on the designed communication line, evaluating the anti-interception performance and the anti-interference performance from the communication method, the frequency and the transmission path, and performing handover of any node that is a moving object at the destination of the movement.

At last, the external control device 301 transmits the route information calculated as described above to the radio communication apparatus and a router part. The router part is connected to a communication interface of the radio communication apparatus and achieves route switching required for the network routing.

Figure 13:
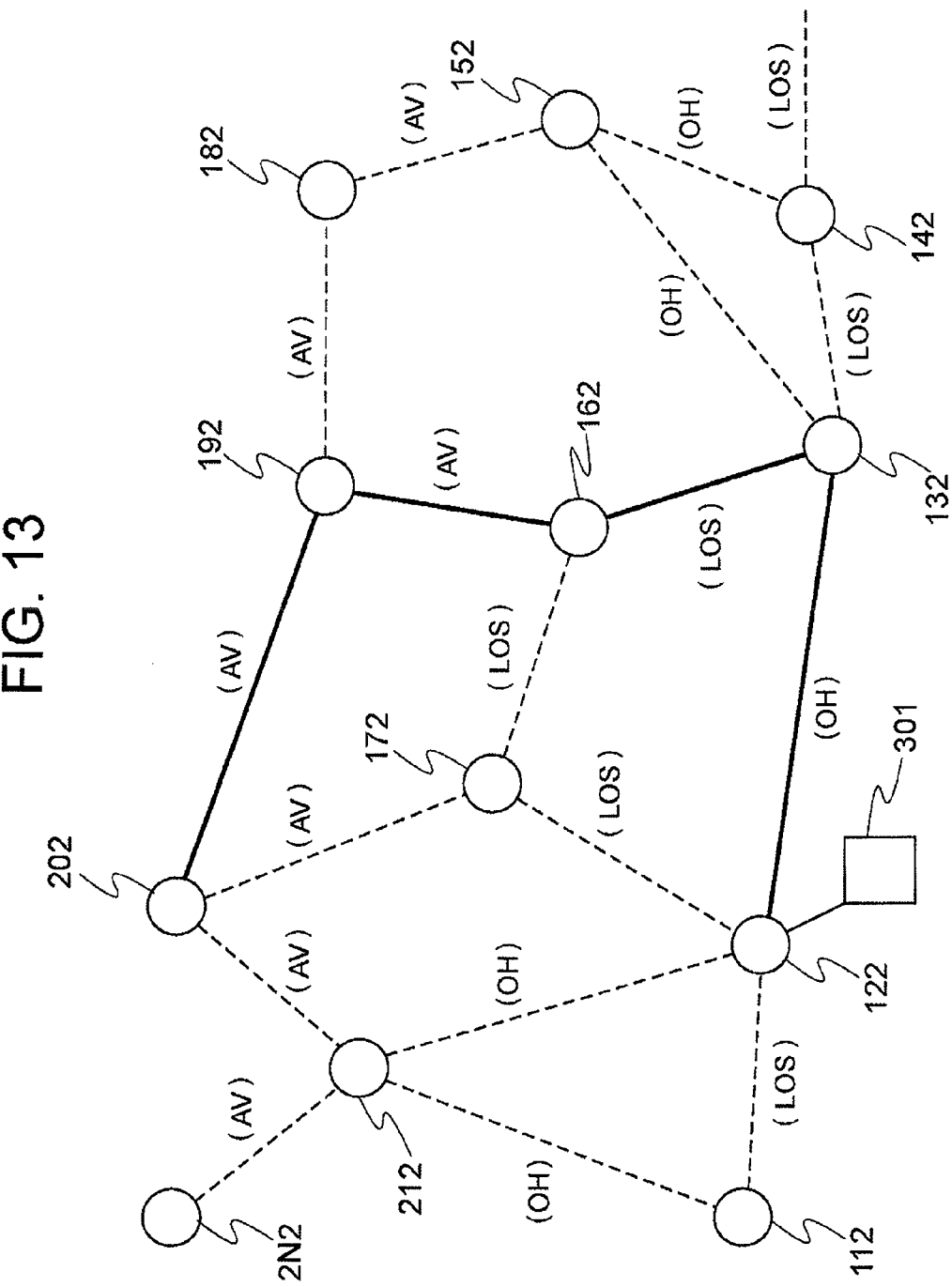
FIG. 13 is a diagram for illustrating a routing control in the radio network system according to a third exemplary embodiment of the present invention.
Figure 14:
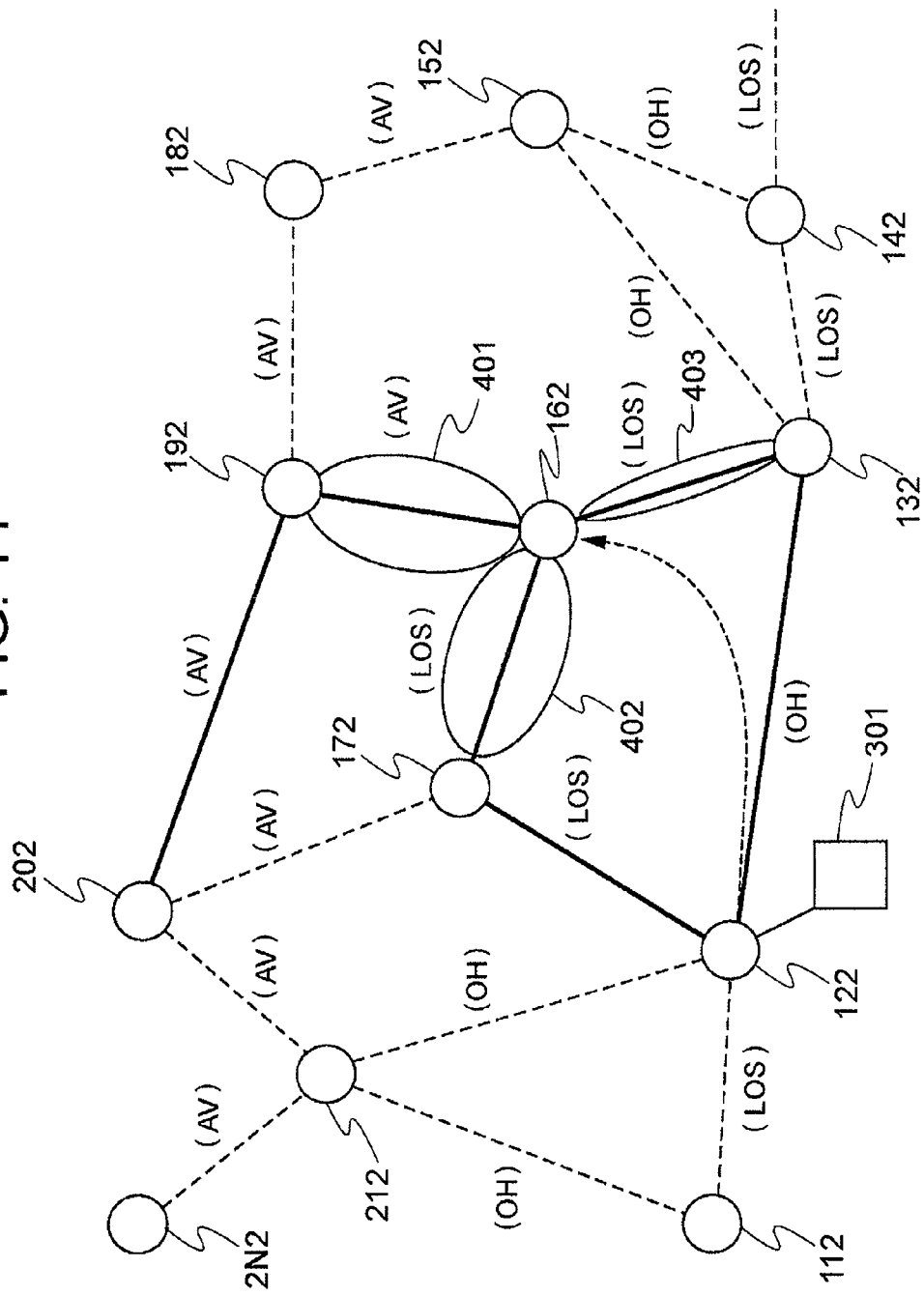
FIG. 14 is a diagram for illustrating a routing control in the radio network system according to a third exemplary embodiment of the present invention.

FIGS. 13 and 14 are block diagrams for illustrating a routing control in the radio network system according to a third exemplary embodiment of the present invention. In the mesh network consisting of the communication nodes 112, 122, 132, 142, 152, 162, 172, 182, 192, 202, 212, . . . , 2N2 shown in FIG. 13, under the control of the external control device (such as a network control device) 301, a network route (indicated by the bold line in FIG. 13) that minimizes the transmission delay of the data to be transmitted is formed. If a failure occurs in the link, the external control device 301 forms a bypass mute to ensure the information transmission.

When the OH communication occurs between the communication nodes 122 and 132 as shown in FIG. 14, the phased array antenna of the communication node 162 is controlled to form a null in the antenna pattern against the radio wave of the OH communication from the communication node 122 in order to prevent the radio wave of the OH communication from interfering with the communication node 162.

In the null control, the external control device 301 calculates an interference pattern in the network and controls the beams emitted from the phased array antenna so as to avoid interference based on the interference pattern. Antenna patterns 401 to 403 indicate that three beams are directed from the communication node 162 to the target communication nodes 192, 172 and 132.

As described above, according to this embodiment, the external control device 301 calculates an interference pattern in the network and controls the beams emitted from the phased array antenna so as to avoid interference based on the interference pattern, thereby preventing interference of the OH communication.

With the configurations and operations described above, the present invention has an advantage that each communication node does not have to have multiple radio devices installed therein, and a data link of any of the LOS communication, the OH communication and the AV communication can be constructed with a single radio device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A radio communication apparatus, comprising:
  a line-of-sight communication processing part that controls a beam from a phased array antenna to establish a line-of-sight communication, which is used when there is no obstacle in a radio transmission channel;
  an over-the-horizon communication processing part that controls the beam from said phased array antenna to establish an over-the-horizon communication, which is used when there is an obstacle in said radio transmission channel; and
  an aerial-vehicle communication processing part that controls the beam from said phased array antenna to establish an aerial-vehicle communication, which is used for communication with a communication node on a flying object,
  wherein said phased array antenna switches among said line-of-sight communication, said over-the-horizon communication and said aerial-vehicle communication.

2. The radio communication apparatus according to claim 1, further comprising:
  a determination part that determines which of said line-of-sight communication, said over-the-horizon communication and said aerial-vehicle communication is to be used based on positional information from an opposing link target apparatus,
  wherein the communication processing part corresponding to the communication method determined by said determination part to be used controls the beam from said phased array antenna.

3. The radio communication apparatus according to claim 2, wherein said determination part determines the presence or absence of an obstacle in the radio transmission channel between the radio communication apparatus and said link target apparatus and the presence or absence of movement of said link target apparatus based on said positional information, and determines which of said line-of-sight communication, said over-the-horizon communication and said aerial-vehicle communication is to be used based on the result of the determination.

4. The radio communication apparatus according to claim 1, wherein the radio communication apparatus forms a one-to-N or N-to-N radio link network by a combination of multiple beams from said phased array antenna and a multiple access method (N represents an integer equal to or greater than 2).

5. The radio communication apparatus according to claim 4, wherein said multiple access method includes at least a time division multiple access method, a frequency division multiple access method, a space division multiple access method and a code division multiple access method.

6. The radio communication apparatus according to claim 4, further comprising:
  a null control part that performs null control of an antenna pattern to avoid interference between communications in multiple directions in assignment of a type of multi-dimensional communication and a type of said multiple access method.

7. The radio communication apparatus according to claim 6, wherein the radio communication apparatus forms a network that avoids interference between communications in multiple directions by determining said communication method, determining a multiple access parameter and performing null control of said antenna pattern according to a network routing indication from an external control device.

8. A radio network system, comprising a radio communication apparatus according to claim 1.

9. A data link construction method, wherein a radio communication apparatus is configured to be capable of performing:
a line-of-sight communication processing that controls a beam from a phased array antenna to establish a line-of-sight communication, which is used when there is no obstacle in a radio transmission channel;
an over-the-horizon communication processing that controls the beam from said phased array antenna to establish an over-the-horizon communication, which is used when there is an obstacle in said radio transmission channel; and
an aerial-vehicle communication processing that controls the beam from said phased array antenna to establish an aerial-vehicle communication, which is used for communication with a communication node on a flying object, and
the data link construction method comprises a switch processing that switches among said line-of-sight communication, said over-the-horizon communication and said aerial-vehicle communication with said phased array antenna.

10. The data link construction method according to claim 9, wherein in said switch processing, a determination processing is performed to determine which of said line-of-sight communication, said over-the-horizon communication and said aerial-vehicle communication is to be used based on positional information from an opposing link target apparatus, and
the beam from said phased array antenna is controlled according to the communication processing corresponding to the communication method determined by said determination processing to be used.

11. The data link construction method according to claim 10, wherein in said determination processing, the presence or absence of an obstacle in the radio transmission channel between the radio communication apparatus and said link target apparatus and the presence or absence of movement of said link target apparatus are determined based on said positional information, and it is determined which of said line-of-sight communication, said over-the-horizon communication and said aerial-vehicle communication is to be used based on the result of the determination.

12. The data link construction method according to claim 9, wherein a one-to-N or N-to-N radio link network is formed by a combination of multiple beams from said phased array antenna and a multiple access method (N represents an integer equal to or greater than 2).

13. The data link construction method according to claim 12, wherein said multiple access method includes at least a time division multiple access method, a frequency division multiple access method, a space division multiple access method and a code division multiple access method.

14. The data link construction method according to claim 12, wherein in assignment of a type of multi-dimensional communication and a type of said multiple access method, null control of an antenna pattern is performed to avoid interference between communications in multiple directions.

15. A data link construction method, wherein a radio communication apparatus is configured to be capable of performing:
a line-of-sight communication processing that controls a beam from a phased array antenna to establish a line-of-sight communication, which is used when there is no obstacle in a radio transmission channel;
an over-the-horizon communication processing that controls the beam from said phased array antenna to establish an over-the-horizon communication, which is used when there is an obstacle in said radio transmission channel; and
an aerial-vehicle communication processing that controls the beam from said phased array antenna to establish an aerial-vehicle communication, which is used for communication with a communication node on a flying object, and
the data link construction method comprises a switch processing that switches among said line-of-sight communication, said over-the-horizon communication and said aerial-vehicle communication with said phased array antenna, and
a determination processing is performed to determine which of said line-of-sight communication, said over-the-horizon communication and said aerial-vehicle communication is to be used based on positional information from an opposing link target apparatus, and
the beam from said phased array antenna is controlled according to the communication processing corresponding to the communication method determined by said determination processing to be used,
wherein a one-to-N or N-to-N radio link network is formed by a combination of multiple beams from said phased array antenna and a multiple access method (N represents an integer equal to or greater than 2).

16. The data link construction method according to claim 15, wherein in said determination processing, the presence or absence of an obstacle in the radio transmission channel between the radio communication apparatus and said link target apparatus and the presence or absence of movement of said link target apparatus are determined based on said positional information, and it is determined which of said line-of-sight communication, said over-the-horizon communication and said aerial-vehicle communication is to be used based on the result of the determination.

17. A radio communication apparatus, comprising:
a line-of-sight communication processing means that controls a beam from a phased array antenna to establish a line-of-sight communication, which is used when there is no obstacle in a radio transmission channel;
an over-the-horizon communication processing means that controls the beam from said phased array antenna to establish an over-the-horizon communication, which is used when there is an obstacle in said radio transmission channel; and
an aerial-vehicle communication processing means that controls the beam from said phased array antenna to establish an aerial-vehicle communication, which is used for communication with a communication node on a flying object,
wherein said phased array antenna switches among said line-of-sight communication, said over-the-horizon communication and said aerial-vehicle communication.

* * * * *